(12) United States Patent
Yamaguchi et al.

(10) Patent No.: US 7,084,368 B2
(45) Date of Patent: Aug. 1, 2006

(54) THERMAL CUTTING MACHINE AND CUTTING METHOD USING SAME

(75) Inventors: Yoshihiro Yamaguchi, Kaga (JP); Tetsuya Kabata, Kaga (JP)

(73) Assignee: Komatsu Industries Corporation, Tokyo (JP)

( * ) Notice: Subject to any disclaimer, the term of this patent is extended or adjusted under 35 U.S.C. 154(b) by 0 days.

(21) Appl. No.: 10/639,757

(22) Filed: Aug. 13, 2003

(65) Prior Publication Data
US 2004/0104203 A1 Jun. 3, 2004

(30) Foreign Application Priority Data
Aug. 21, 2002 (JP) ............................. 2002-240961

(51) Int. Cl.
*B23K 9/02* (2006.01)
(52) U.S. Cl. ........................ 219/121.39; 219/121.36; 219/121.56; 219/68
(58) Field of Classification Search .......... 219/121.39, 219/121.48, 121.58, 121.6, 121.67, 68, 121.36; 266/49, 65, 48, 50; 83/167, 451; 454/7; 126/622, 628, 629, 686; 372/107; 392/409
See application file for complete search history.

(56) References Cited

U.S. PATENT DOCUMENTS

| | | | | |
|---|---|---|---|---|
| 2,240,913 A | * | 5/1941 | Roskos ....................... 392/409 |
| 4,063,059 A | * | 12/1977 | Brolund et al. ................ 219/68 |
| 4,475,719 A | * | 10/1984 | Lotz ............................. 266/48 |
| 5,734,143 A | * | 3/1998 | Kawase et al. ......... 219/121.43 |
| 5,763,852 A | * | 6/1998 | Brolund et al. ......... 219/121.44 |
| 5,866,872 A | * | 2/1999 | Lu et al. ................. 219/121.56 |
| 6,165,410 A | * | 12/2000 | Crees et al. ................... 266/49 |
| 6,761,776 B1 | * | 7/2004 | Bowlin et al. .............. 148/196 |

FOREIGN PATENT DOCUMENTS

| | | | |
|---|---|---|---|
| JP | 06079441 A | * | 3/1994 |
| JP | 7-136767 | | 5/1995 |
| JP | 9-57438 | | 3/1997 |

* cited by examiner

Primary Examiner—Quang Van
(74) Attorney, Agent, or Firm—Westerman, Hattori, Daniels & Adrian, LLP.

(57) ABSTRACT

A thermal cutting machine and a cutting method using the same are described, which employ a simple, long-life torch hood for effectively shutting off spatter, the torch hood enabling easy supervision of the cut condition of a workpiece and easy replacement of the consumable parts of the torch. In the thermal cutting machine for cutting a metal by a plasma arc or laser beam generated from the torch, a hood liftable by an actuator is disposed so as to surround the torch and a control unit is provided for giving an instruction to the actuator to lower the hood to a torch-shielding position.

5 Claims, 9 Drawing Sheets

(a) MOVEMENT OF TORCH TO A PIERCING LEVEL (b) DOWNWARD MOVEMENT OF HOOD → HOOD IS CLOSE CONTACT WITH WORKPIECE (c) ARC IGNITION → START OF PIERCING (d) COMPLETION OF PIERCING (e) UPWARD MOVEMENT OF HOOD

DISPERSION OF SPATTER

THERMAL CUTTING MACHINE AND CUTTING METHOD USING SAME

TECHNICAL FIELD

The present invention relates to a thermal cutting machine such as a plasma cutting machine and laser cutting machine and a cutting method using such a thermal cutting machine. More particularly, the invention relates to a technique for shutting off spatter mainly in the course of a cutting operation.

BACKGROUND ART

When thermally cutting a metal sheet material (hereinafter referred to as "workpiece") by use of a conventional thermal cutting machine such as a plasma cutting machine or laser cutting machine, molten material produced from cuts of the workpiece by a plasma arc or laser beam flies in all directions in the form of spatter (molten metal splash) owing to the gas pressure of plasma gas jetted from the torch. The spatter as well as fumes (metal vapor) and noise which are generated simultaneously with the spatter worsen the working condition of the work site. As attempts to solve this problem, there have been developed various techniques for preventing dispersion of spatter generated in the course of cutting operations and for shutting off fumes, arc light and noise.

One known technique for preventing dispersion of spatter and for shutting off arc light is such that a fire-resistant fabric such as asbestos is fixedly disposed to surround the torch like a curtain, for preventing damage caused by spatter (a first known technique).

Another proposal is the hood set out in Japanese Patent Publication KOKAI Gazette No. 7-136767 (a second known technique). A cross-sectional view of the hood of this publication is shown in FIG. 9.

Referring to FIG. 9, a hood B is mounted at the leading end of a plasma torch body 101 so as to be movable in an axial direction of the plasma torch body 101. A hood holder 103 is secured to the leading end of the plasma torch body 101 for restricting the movement of the hood B and holding the hood B at a specified restricted position. The hood B includes a mounting portion which is positioned at the substantial center of the hood B and has a hole corresponding to the outside diameter of the plasma torch A, and a wall portion surrounding the mounting portion, extending downwardly therefrom. The mounting portion and the wall portion are made from a sound absorbing material. A cap 102 for the plasma torch A is covered with a sound insulating wall 104 made from a steel sheet, stainless steel sheet or synthetic resin sheet having fire resistance. The hood B is lowered by its own weight relative to the plasma torch body 101 to the aforesaid restricted position where the hood B is held by the hood holder 103 so that the hood B and the workpiece C has a specified positional relationship even when the plasma torch A is lowered below a specified level.

According to the above publication, if there exists a clearance between the hood B and the workpiece C, spatter, noise and light will leak therethrough and therefore the hood B and the workpiece C should be in close contact with each other. The above publication also discusses that if the hood B and the workpiece C closely contact each other, one end of a cut of the workpiece C may uprise (see FIG. 7) or the surface of the workpiece C, in which a thermal strain has occurred, may collide with the hood B with the result that processing of the workpiece C cannot be continued, and that, in view of this, it is desirable to use a steel sheet or stainless steel sheet having moderate flexibility or a flame-resistant synthetic resin sheet as the construction material of the hood B.

Another proposal is a dust collector for a thermal cutting machine such as disclosed is Japanese Patent Publication Kokai Gazette No. 9-57438 (a third known technique). This dust collector covers the thermal cutting machine and the entire upper face of the main body table, and includes a slide cover extensible in a longitudinal direction of the main body table. The slide cover is single-hinged with at least one longitudinal end being fixed. For replacement of the workpiece, the torch can be housed at the side of the fixed end of the slide cover. Dust on the upper and lower parts of the main body table can be collected outside the machine by means of a dust collector pipeline. The effect of the dust collector resides in that since cutting operation can be carried out with the slide cover portion being in its closed state, entirely covering the cutting machine, dust produced above the main body table is prevented from dispersing within the work site by the slide cover portion and noise, fumes, spatter, arc light and others can be shut off during the cutting operation.

The first to third techniques described earlier, however, present the following disadvantages.

In the first known technique, although a hood made from a fire-resistant fabric such as asbestos encloses the torch in a curtain-like manner, this fabric hood is melted down within a short time by the spatter (i.e., splash) of high-temperature molten metal so that it loses its original function and, thus, has very short service life. Therefore, even if the manufacturer fits the machine with a new hood before delivery to the user, frequent replacement of the hood and troublesome maintenance are required at the users site. In the present circumstances, the hood which has lost its shielding function is sometimes used without replacement.

The following is the drawbacks of the second known technique disclosed in Japanese Patent Publication *Kokai* Gazette No. 7-136767.

(1) During an actual plasma cutting operation, there may occur such a phenomenon that as shown in FIG. 7, a small cut piece of the workpiece, which has been cut on the table, topples as it cannot keep a horizontal state, losing a support from the work-supporting bars of the table. Since the hood B surrounding the torch horizontally moves with its lower end being close to the workpiece, there is the possibility that slight inclination of the workpiece may cause interference between the lower part of the hood B and the raised portion of the workpiece, leading to breakage of the hood B. Further, in some cases, the interference between the lower part of the hood B and the workpiece imposes an excessive load on the horizontal movement of the torch, bringing the machine to a stop.

(2) Although the publication proposes, as a measure for solving the above problem, use of a steel sheet or stainless steel sheet having moderate flexibility or use of a flame-resistant synthetic resin sheet as the construction material of the hood B, the wall portion of the hood B, in reality, bends to a considerable extent when it interferes with the workpiece C. Further, it is undeniable in consideration of the frequency of the interference that the interference could be an obstacle to the movement of the torch.

In this case, it is necessary, on account of damage to the hood, to stop the machine to avoid the interference with the workpiece. If the interference results in breakage of the hood, there will arise a need for work such as restoration, which leads to interruption of the automatic operation of the machine. Further, the down time and recovery time cause a drop in the machine utilization rate and, in consequence, decreased productivity, so that this technique is off from practical use because it cannot meet the demands toward unattended operation such as nighttime automatic operation. In addition, for applying this previous technique to an actual plasma cutting machine, the following conditions should be met: the workpiece has to be cut into shapes which do not cause an uprise of a cut piece and the degree of thermal deformation of the workpiece must be insignificant. In this respect, the second known technique is difficult to put to practical use.

(3) As seen from FIG. 4, a largest amount of spatter is produced, dispersing in all directions in the piercing phase prior to the cutting phase. The direction in which a largest amount of spatter disperses is a horizontal direction along the workpiece. Taking this into account, it is necessary to bring the lower end of the hood into sufficiently tight contact with the workpiece in order to effectively shut off the spatter. The use of a steel sheet, stainless steel sheet or flame-resistant synthetic resin sheet as the material of the hood, which is proposed by the second known technique, provides a service life longer than heat-resistant fabrics but cannot maintain a little clearance between the workpiece and the lower end of the hood, because such materials are melted down sooner or later by a large amount of spatter produced during the piercing phase. Therefore, the effect of shutting off spatter does not last for a long time. For this reason, the second known technique has not proved practical.

(4) The second technique also proposes use of a transparent synthetic resin sheet for the side walls of the hood to enable easy supervision of the condition of the plasma arc and the condition of the workpiece being processed. However, spatter adheres to and melts the synthetic resin sheet, so that the synthetic resin sheet loses transparency and, therefore, cannot come in practical use.

(5) In addition, it is necessary to remove the cap of the torch to replace consumable parts attached to the leading end of the torch such as the nozzle and electrodes several times per day, although the frequency of replacement depends on the amount of cutting. If there is a hood or cover near the torch, workability at the time of replacement decreases. Although the second known technique teaches that replacement of the consumable parts can be carried out while lifting up the hood by hand, this causes a considerable decrease in workability because the removal of the cap and the replacement of the consumable parts need to be carried out by one hand, while the other hand is tied up with pressing-up of the hood.

The third known technique disclosed in Japanese Patent Publication Kokai Gazette No. 9-57438 provides the slide cover which is designed to cover the thermal cutting machine and the entire upper face of the main body table and is therefore large and heavy, so that opening and closing of the slide cover requires a lot of labor and accompanies many troubles. Since the slide cover needs to be frequently opened and closed, for instance, at the time of setting and removal of a workpiece, replacement of the nozzle of the torch, and monitoring of the cut condition of the workpiece, down time due to the opening/closing of the slide cover increases, causing a decrease in machine utilization rate, and thus, the third technique presents a problem in productivity. The slide cover is difficult to manufacture because it is a large-sized component made by sheet metal processing. In addition, the clearance in the sliding part of the slide cover requires high dimensional accuracy in order to provide smooth opening and closing movement and prevent a leakage of fumes to the outside of the cover. These factors entail high production cost.

The invention has been directed to overcoming the foregoing problems and a primary object of the invention is therefore to provide a thermal cutting machine and a cutting method using the same, which employ a simple, long-life torch hood for effectively shutting off spatter generated in a thermal cutting operation to keep good working conditions in the work site, the torch hood enabling easy supervision of the cut condition of the workpiece and easy replacement of the consumable parts of the torch.

DISCLOSURE OF THE INVENTION

According to a first aspect of the invention, the above object can be accomplished by a thermal cutting machine for cutting a metal by a plasma arc or laser beam generated from a torch, the machine comprising a hood which is disposed so as to surround the torch and is vertically movable by an actuator.

According to the invention, since a liftable hood surrounds the torch and is designed to be moved up and down by an actuator, the hood can be timely lowered to bring the lower end of the hood into sufficiently tight contact with the workpiece in the piercing phase during which most of the spatter generated in the operation is produced, dispersing (particularly, in a horizontal direction) in a wide area around the nozzle. Since piecing can be carried out in the above condition, almost all of the spatter can be shut off. As a result, dispersion of the spatter in a wide surrounding area can be effectively suppressed so that the working environment of the plasma cutting machine or laser cutting machine can be significantly improved.

During the cutting phase, the lower end of the hood can be separated from the upper face of the workpiece to a minimum necessary extent, with a specified gap between the lower end of the hood and the upper face of the workpiece. Therefore, even if the workpiece uprises or warps due to thermal deformation, there is no danger of interference between the hood and the workpiece and therefore interruption of the movement of the torch. As a result, unattended operation/automation such as nighttime automatic operation becomes possible, leading to increased productivity.

In addition, since the interference between the hood and workpiece can be avoided during the movement of the torch, there is no need to use a flexible thin sheet for the hood. This allows use of a heat-resistant, rigid steel plate or the like so that the hood will not be easily melted by the spatter and the durability of the hood can be markedly improved.

By lifting the hood from its torch-shielding position to a specified required level through timely operation of a manual operation switch or programmed control such that the position of the nozzle can be seen, the condition of the plasma arc or laser beam during the cutting phase and the condition of the workpiece being processed can be easily observed. For replacement of the consumable parts of the torch, the hood is lifted to a required level and held at that position, whereby replacement of the consumable parts can be safely carried out by both hands.

Preferably, the invention includes a control unit for giving an instruction to the actuator to lower the hood to a torch-shielding position for covering the torch at least during the piercing phase.

With this arrangement, the hood can be lowered to the torch shielding position at least in the piercing phase, so that the hood can be timely lowered to effectively shut off almost all of the spatter during the piecing phase in which most of the total amount of spatter generated in the cutting operation is generated, dispersing (particularly, in a horizontal direction) in a wide area around the nozzle. As a result, the dispersion of the spatter in a wide surrounding area can be suppressed and the working environment of the plasma cutting machine or the laser cutting machine can be significantly improved.

Preferably, the control unit gives an instruction to the actuator to lift the hood to a specified level in a cutting phase subsequent to the piercing phase. With this arrangement, interference between the hood and the workpiece can be avoided during the movement of the torch so that the hood will not be easily melted by the spatter as described earlier and, in consequence, the durability of the hood can be markedly improved.

Preferably, the hood is composed of a hood body and a lower hood member detachably attached to the lower part of the hood body. With this arrangement, the spatter adhering to the hood can be easily removed, and even if the hood gets damaged, only the damaged part can be replaced so that not only improved maintainability can be attained but also the down time of the machine caused by replacement can be reduced.

According to a second aspect of the invention, there is provided a cutting method by use of a thermal cutting machine wherein a metal is cut by a plasma arc or laser beam generated from a torch, and wherein a liftable hood is lowered to cover the torch at least during a piercing phase, thereby shutting off spatter flying from a cut area of the metal.

According to the invention, since the hood is lowered from its retracting position in order to cover the torch at least during the piercing phase, the hood can shut off almost all of the spatter produced in the cutting operation similarly to the first aspect of the invention. Therefore, dispersion of the spatter in a wide surrounding area can be drastically reduced and the working environment of the plasma cutting machine or laser cutting machine can be significantly improved.

Preferably, in the invention, the hood can be lifted to a specified level during a cutting phase subsequent to the piercing phase and during replacement of the consumable parts of the torch.

With this arrangement, the hood can be selectively moved up and down to a specified level as required, and shutting off of spatter, fumes and noise as well as prevention of transmittance of arc light or laser beam can be carried out when necessary. More specifically, in the piercing phase, the actuator is automatically, timely activated through programmed control or selectively activated through operation of the manual operation switch such that the hood is lowered and brought into sufficiently tight contact with the workpiece to perform piercing operation. This vertical movement of the hood enables it to shut off almost all of the spatter generated in the cutting operation. Therefore, dispersion of the spatter in a wide surrounding area can be drastically reduced and the working environment of the plasma cutting machine or laser cutting machine can be significantly improved. In addition, in the cutting phase, an area of the workpiece which is likely to uprise is thermally cut by the torch being moved, under such a condition that the hood has been lifted beforehand through programmed control or through timely operation of the manual operation switch and held at a position separated from the upper face of the workpiece to the minimum necessary extent with a specified gap between the lower end of the hood and the upper face of the workpiece. Since there is a proper gap between the lower end of the hood and the upper face of the workpiece, the hood will not interfere with the workpiece even if the workpiece uprises, so that there is no danger of interrupting the movement of the torch. This enables unattended operation/automation such as nighttime automatic operation and, in consequence, improved productivity can be expected.

For observing the plasma arc or laser beam during the cutting phase, the hood is lifted from the torch shielding position to a required level through timely operation of the manual operation switch or programmed control and kept at the position where the nozzle and other parts are visible to the operator. With this arrangement, the operator can easily observe the condition of the plasma arc or laser beam, the condition of the workpiece being processed and can check the consumption of the nozzle and other parts. For replacement of consumable parts such as the nozzle, the hood is lifted to the upper end position through the operation of the manual operation switch or programmed control and kept thereat, so that replacement of the consumable parts of the torch can be safely, easily carried out by both hands.

BEST MODE FOR CARRYING OUT THE INVENTION

Referring now to the accompanying drawings, a thermal cutting machine and a cutting method using the same will be hereinafter described according to preferred embodiments of the invention.

Figure 1:
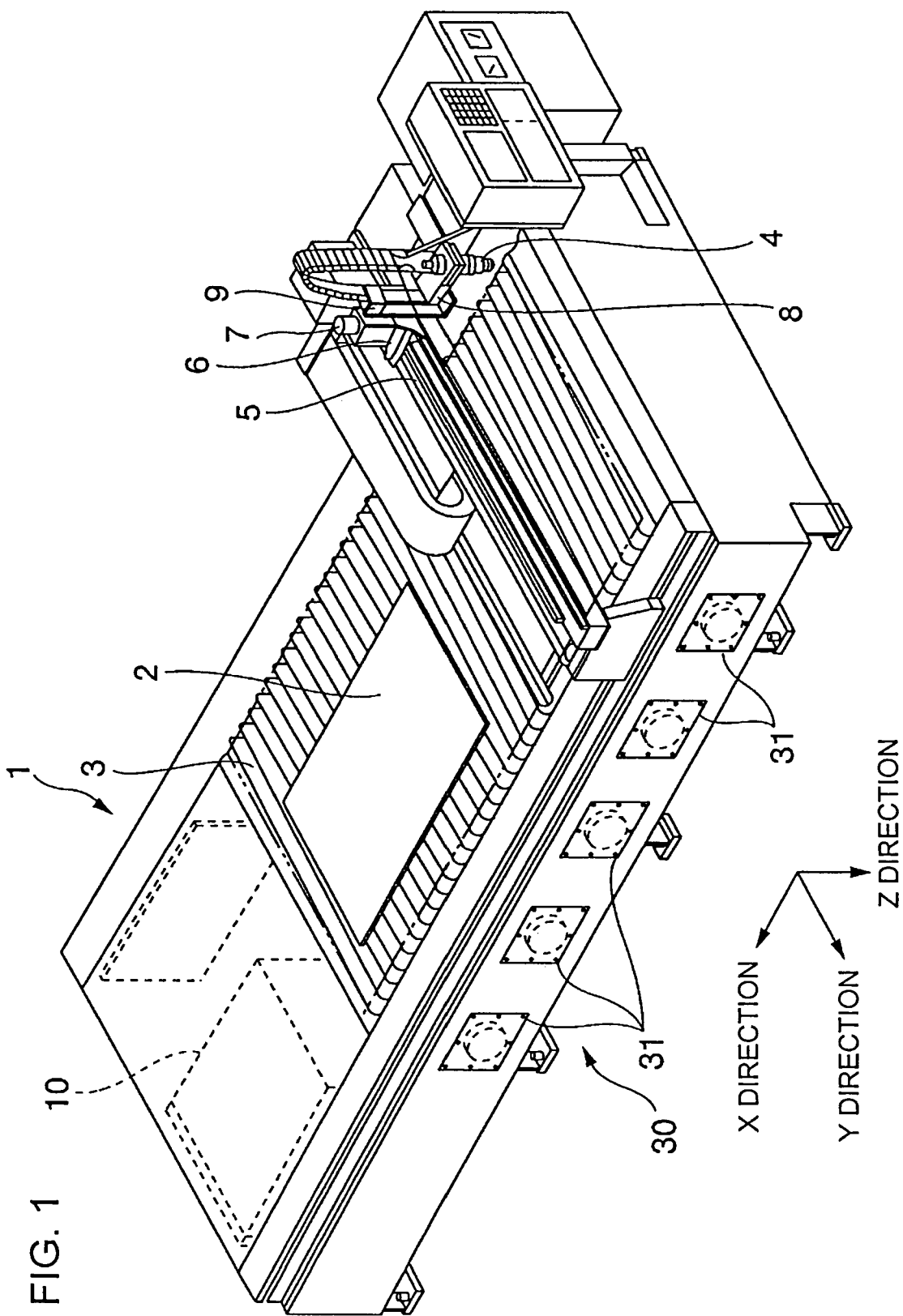
FIG. 1 is a general perspective view of a plasma cutting machine which exemplifies a thermal cutting machine according to one embodiment of the invention.

FIG. 1 is a general perspective view of a plasma cutting machine which exemplifies a thermal cutting machine according to one embodiment of the invention.

A plasma cutting machine 1 of the present embodiment has a cutting table 3 for supporting a workpiece 2 and a dust collector 30 disposed under the cutting table 3 for collecting spatter, fumes and high pressure gas (flue gas) and the like, which are generated in the cutting phase, by means of a plurality of push-pull type fans 31 disposed at the opposed side faces of the table 3. Disposed above the cutting table 3 is a Y-axis carriage 5 movable in the direction of X axis which is one of the orthogonal two axes in the plane of the table 3. Disposed above the Y-axis carriage 5 is a Z-axis truck 6 movable in the direction of Y axis which is the other of the orthogonal two axes. In the Z-axis truck 6, a Z-axis movable carriage 8 is disposed so as to be movable in the direction of Z axis which crosses the X and Y axes at right angles. Mounted on the Z-axis movable carriage 8 is a plasma torch 4 for jetting a plasma arc. For the X, Y and Z axes, an X-axis servo motor (not shown), a Y-axis servo motor 7 and a Z-axis servo motor 9 are provided as driving means associated with the respective axial directions.

There is provided a control unit 10 for performing specified shape cutting operation by moving the plasma torch 4 on the X-Y plane such that the workpiece 2 is cut into a predetermined shape. The control unit 10 outputs an NC control instruction to the X-axis servo motor, the Y-axis servo motor 7 and the Z-axis servo motor 9 according to a specified workpiece processing NC program to control the position and speed of the shaft of each servo motor. The control unit 10 has a Z-axis control function in which in the event that the workpiece 2 warps owing to thermal deformation, being displaced in its thickness-wise direction (i.e., the direction of the Z axis) in the course of a cutting operation, the amount of the displacement is detected based on arc current or arc voltage and the position of the Z-axis servo motor 9 is controlled based on the detected displacement amount, thereby keeping the distance between the plasma torch 4 and the workpiece 2 to a proper value (i.e., the stand-off control) to carry out a sound cutting operation.

Figure 2:
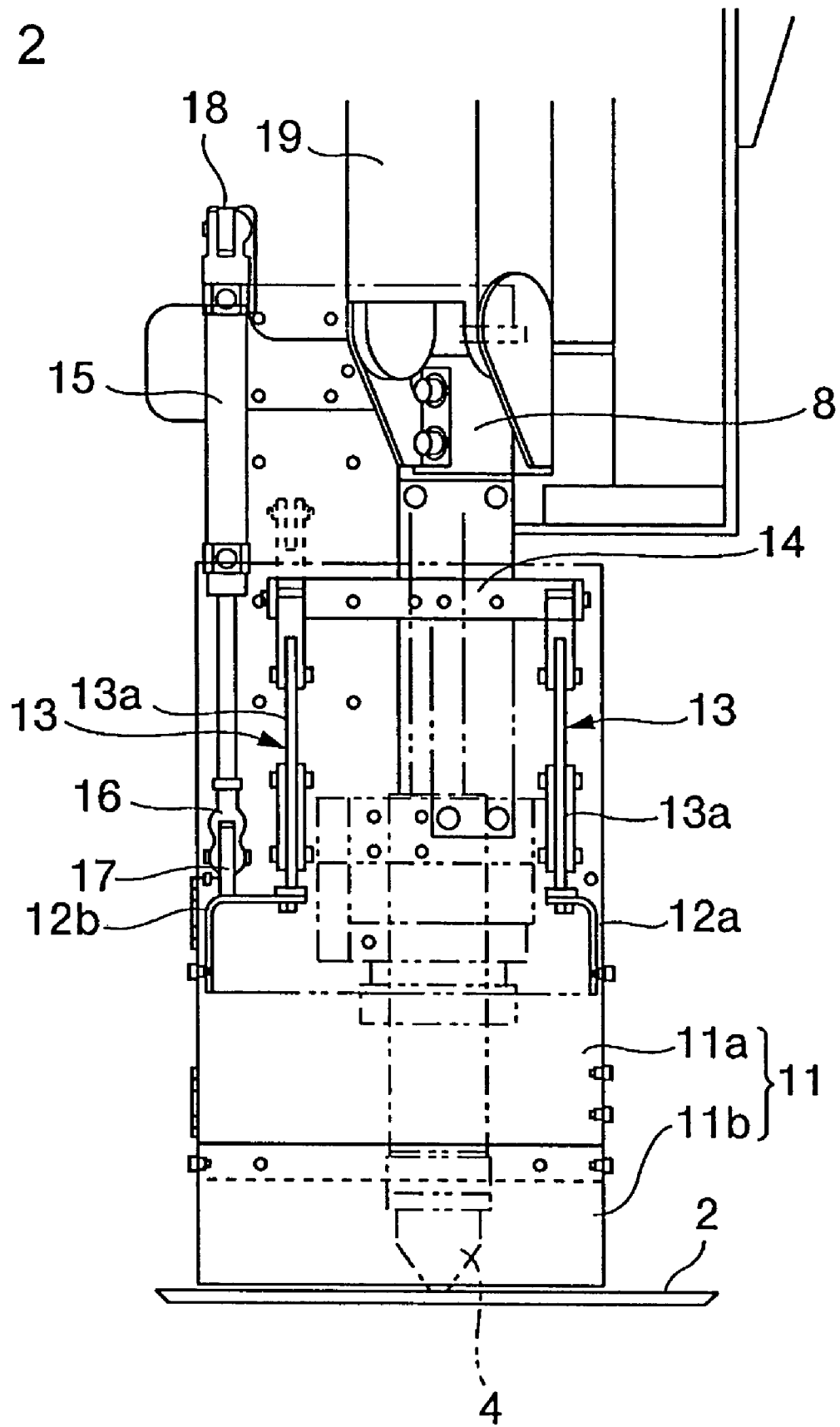
FIG. 2 is a front view of a hood provided for the plasma cutting machine of the present embodiment.
Figure 3:
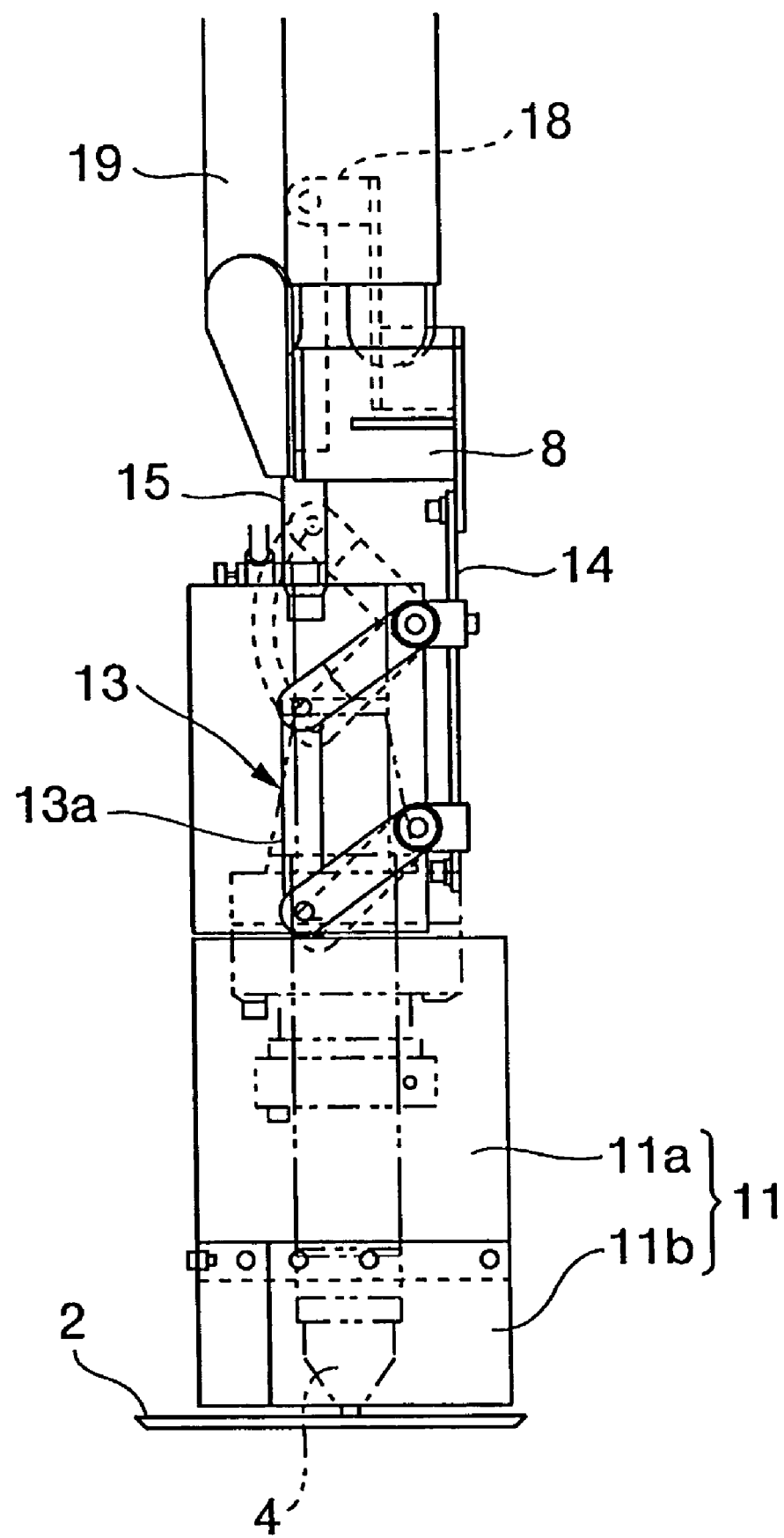
FIG. 3 is a side view of the hood provided for the plasma cutting machine of the present embodiment.

Reference is made to FIGS. 2 and 3 which show the front and side views, respectively, of the hood of the plasma cutting machine 1 to describe the details of the structure of the hood of the present embodiment.

In FIGS. 2 and 3, the hood 11 comprises (i) a lower hood member 11b for covering the nozzle disposed at the leading end of the plasma torch 4 to shut off spatter and (ii) a hood body 11a attached to the upper part of the lower hood member 11b for supporting the lower hood member 11b. The hood body 11a is mounted on the Z-axis movable carriage 8 so as to be vertically movable as described later in detail.

Specifically, a lifting/lowering drive mechanism for moving the hood 11 up and down with respect to the plasma torch 4 comprises an air cylinder 15, a right bracket 12a, a left bracket 12b, a right and left pair of parallel links 13 and a link bracket 14. The head-side end of the air cylinder 15 is coupled, by a pin, to a cylinder supporting bracket 18 attached to the Z-axis movable carriage 8, and the rod-side end of the air cylinder 15 is coupled to a left bracket 12b through a knuckle 16 and a knuckle bearing 17, such that the arm cylinder 15 is freely pitchable. The right bracket 12a and the left bracket 12b are positioned at the right and left, respectively, of the hood body 11a when the hood body 11 is viewed from the front side. The links 13a of the right and left pair of parallel links 13 are attached, at one end thereof (i.e., the lower ends shown in the drawings), to the right and left brackets 12a, 12b, respectively. The links 13a face an upper and lower pair of links (sides) fixed to the Z-axis movable carriage 8 through the link bracket 14.

In the lifting/lowering drive mechanism, when the air cylinder 15 is actuated so as to expand or contract, the pitching links 13a of the right and left pair of parallel links 13 are moved up and down through the right and left brackets 12a, 12b, thereby moving the hood 11 vertically.

A space is provided between the opposed right and left pair of parallel links 13 for installing a wire for transmitting electric power to a plasma electrode (not shown), a hose for gas supply, a hose for supplying and discharging cooling water and others. For flexibly connecting these wire and hoses to the Z-axis truck 6 via the space, there is provided a flexible cable guide 19 one end of which is attached to the Z-axis movable carriage 8 while the other end being attached to the Z-axis truck 6.

In the present embodiment, the hood 11 is divided into two parts, that is, the hood body 11a and the lower hood member 11b on the ground that the lower end part of the hood 11 is more susceptible to adhesion of spatter and therefore needs to be separated from the body of the hood, and the lower hood member 11b is designed to be detachable from the hood body 11a and made to be compact in size. As a result, spatter adhered to the hood can be easily removed and in the event that the hood gets damaged, only the damaged part is replaced, so that improved maintainability can be achieved and down time caused by replacement can be reduced.

Next, the operation of the hood of the present embodiment will be explained.

Plasma cutting is usually carried out in the following way: First, the plasma torch is moved to a starting point. After a plasma arc has been generated at that point, the plasma torch is lowered to perform piercing (the piercing phase). After the plasma arc has pierced the workpiece, the plasma torch is horizontally moved on a specified track through the simultaneous interpolation control of the X-axis and Y-axis servos, thereby cutting the workpiece into the desired shape. After cutting the workpiece 2 into the specified shape, the generation of a plasma arc is stopped and the plasma torch is moved to the next starting point to repeat the cutting operation (arc generation→piercing (the vertical movement of the torch)→cutting into the specified shape (the horizontal movement of the torch)→stopping the arc) in the same manner as described earlier. Thus, the desired cutting operations are carried out and completed.

As described above, the plasma cutting operation is constituted by two phases, i.e., piercing and shape cutting of the workpiece. There will be hereinafter discussed spatter generation and the dispersing condition of spatter in each phase.

Figure 4:
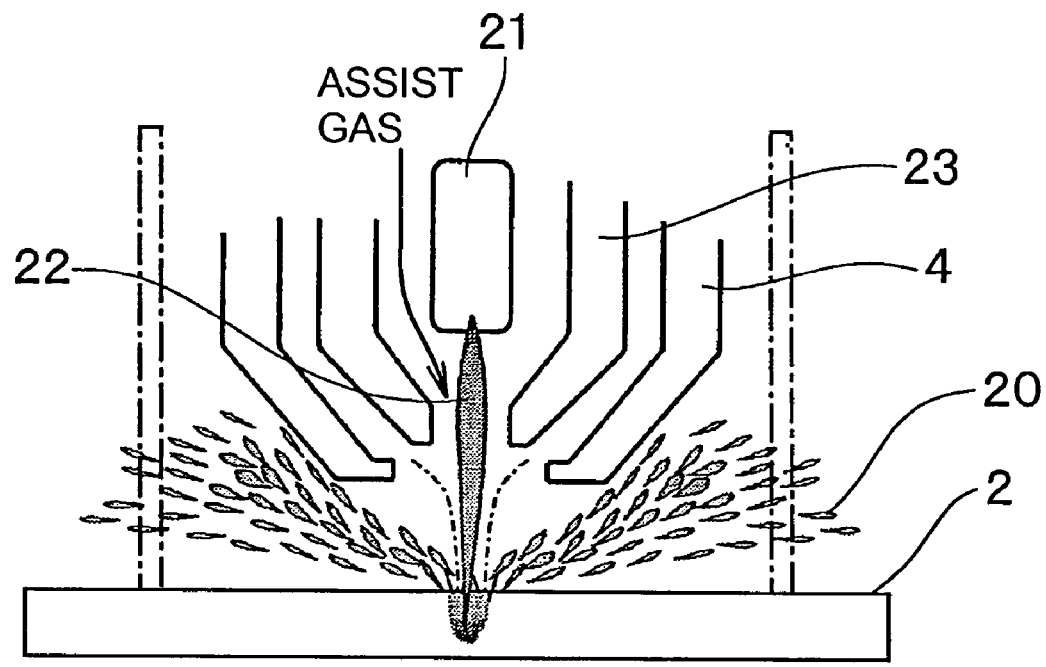
FIG. 4 shows an explanatory diagram illustrating a dispersing condition of spatter in the plasma cutting machine during a piercing phase.

First, the spatter of the piercing phase will be described with reference to FIG. 4. FIG. 4 shows an explanatory diagram illustrating the condition of the spatter that disperses during the piercing phase of the plasma cutting machine. The piercing phase is carried out in the following procedure: a plasma arc 22 is generated between the plasma electrode 21 and the workpiece 2; the plasma torch 4 is lowered; melting of the workpiece by the plasma arc 22 starts from its surface; subsequently, scraping of a hole is continued; finally, the hole passes completely to the other side, thereby completing the phase. As shown in FIG. 4, the molten metal produced at that time forms molten metal splash (spatter 20) owing to the injection force of plasma gas jetted from a nozzle 23 and all of the spatter is blown off, particularly, in a horizontal direction in the area around the plasma torch 4, as the hole has not run through yet and therefore there is no way to escape except the area above the workpiece.

After completion, of the piercing, the plasma torch 4 is horizontally moved to perform arc cutting of the workpiece 2 into the desired shape. Since the cutting of the workpiece 2 is carried out, while formation of a cut groove which finally passes through the workpiece 2 from its upper face to the rear face being still continued by the plasma arc 22, the molten metal produced during the cutting phase is formed into molten metal splash (spatter) by the injection force of plasma gas jetted from the nozzle. Most of the spatter is blown to the rear face (downwardly) of the workpiece 2 and collected within the cutting table 3 while a very small amount of spatter disperses on the upper face of the workpiece.

As to the spatter which disperses in the area around the plasma torch 4, worsening the working environment, the amount of spatter produced in the piercing phase accounts for most of the total amount of spatter generated in the cutting operation.

Figure 5:
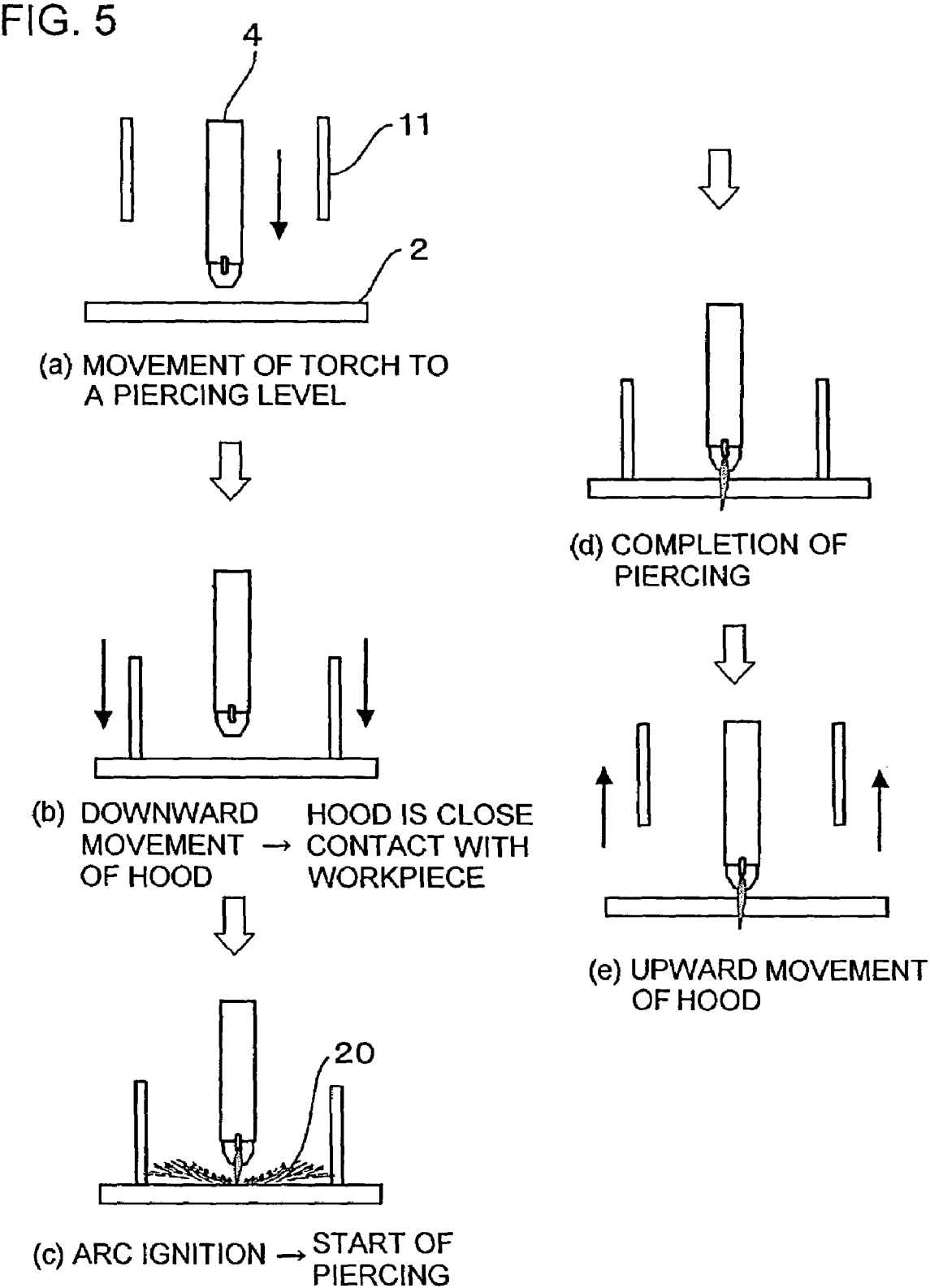
FIG. 5 shows explanatory diagrams illustrating the movement of the hood during the piercing phase according to the present embodiment.

The function of the hood working in the piercing phase will be explained according to the present embodiment, with reference to FIGS. 2 to 4 and FIG. 5. FIG. 5 shows an explanatory diagram illustrating the operation of the hood in the piercing phase of the present embodiment.

Referring to FIG. 5, piercing is carried out in the following way: Firstly, the hood 11 is pulled up to the waiting position located at the upper end by the air cylinder 18 and the plasma torch 4 is horizontally moved to the piercing starting point at which the plasma torch 4 is lowered to a specified piercing starting level (see FIG. 5(a)). Next, the air cylinder 18 is expanded through the programmed control to lower the hood 11 such that the lower end of the lower hood member 11b comes into close contact with the upper face of the workpiece (see FIG. 5(b)). Subsequently, plasma gas is jetted from the nozzle 23 with the lower end of the hood being in close contact with the workpiece, while the plasma arc 22 is produced between the plasma electrode 21 and the workpiece 2, and the plasma torch 4 is lowered to start piercing (see FIG. 5(c)). Thereafter, the piercing proceeds and after a pierced hole has passed completely to the other side (see FIG. 5(d)), the air cylinder 18 is contracted through the programmed control and the hood 11 is raised to a specified level to start the next cutting operation (see FIG. 5(e)).

During the piercing phase, the spatter 20 has no way out except the area above the workpiece 2 so that all of the spatter is blown off, particularly, in a horizontal direction in the area around the torch 4. According to the present embodiment, since the leading end of the plasma torch 4 is completely covered with the hood 11 while the lower end of the hood 11 being in close contact with the workpiece 2 during the piercing phase, all the spatter 20 is shut off by the hood 11 and caught by the inner wall of the hood 11 or collected from the inside of the cutting table 3 by the dust collector 30, so that the spatter does not escape outward.

In the present embodiment, the spatter produced during the piercing phase which accounts for most of the total amount of spatter dispersing around the plasma cutting machine in the cutting operation can be substantially perfectly prevented from dispersing through the control in which the hood is lowered by the actuator to be positioned around the torch and the lower end of the hood is brought into contact with the workpiece, thereby completely shutting off the spatter. As a result, the working environment can be significantly improved.

Next, the operation of the hood 11 during the phase of cutting the workpiece 2 into the desired shape will be described with reference to FIG. 6 which is an explanatory diagram illustrating the operation of the hood during the cutting phase according to the present embodiment.

Figure 6:
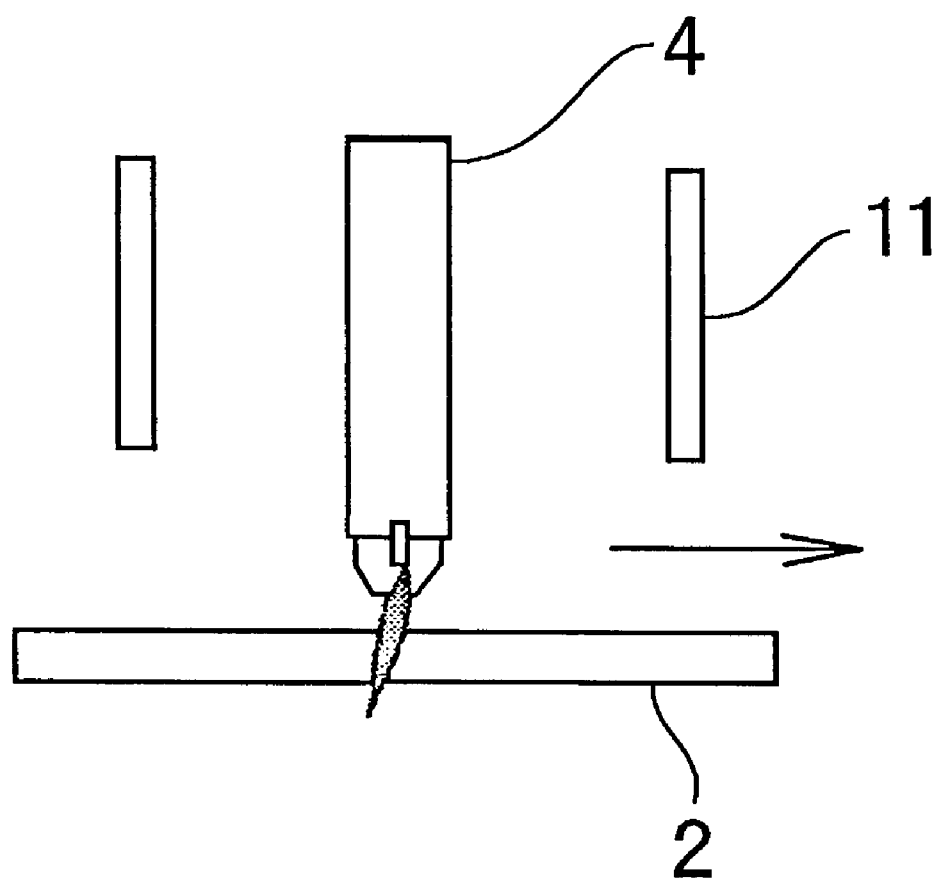
FIG. 6 shows an explanatory diagram illustrating the movement of the hood during a cutting phase according to the present embodiment.

In the cutting phase which is subsequent to completion of the piercing phase, the air cylinder 18 is contracted through the programmed control after the piercing has been completed, so that the hood 1 is lifted until its lower end is positioned a specified level above the contacting position where the lower end is in close contact with the workpiece 2 (see FIG. 6). Then, plasma arc cutting is performed by horizontally moving the plasma torch 4 on a specified track through the simultaneous interpolation control of the X-axis and Y-axis servos, while a specified spacing is kept between the leading end of the plasma torch 4 and the upper face of the workpiece 2 (i.e., the stand-off control) and the hood is kept at the position a specified level above the contacting position.

As described earlier, during the cutting phase, a cut groove is formed so as to pass through the workpiece 2 from its upper face to its rear face and most of the molten metal splash (spatter) generated in the cutting phase is blown off to the rear face (downwardly) of the workpiece 2 owing to the injection force of the plasma gas and collected within the cutting table 3, so that virtually no outward spatter dispersion occurs above the upper face of the workpiece and there is little possibility that the working environment is affected, even if a gap exists between the hood 11 and the upper face of the workpiece 2.

By keeping the hood 1 at the above level, the following effects inherent to the invention can be attained.

Figure 7:
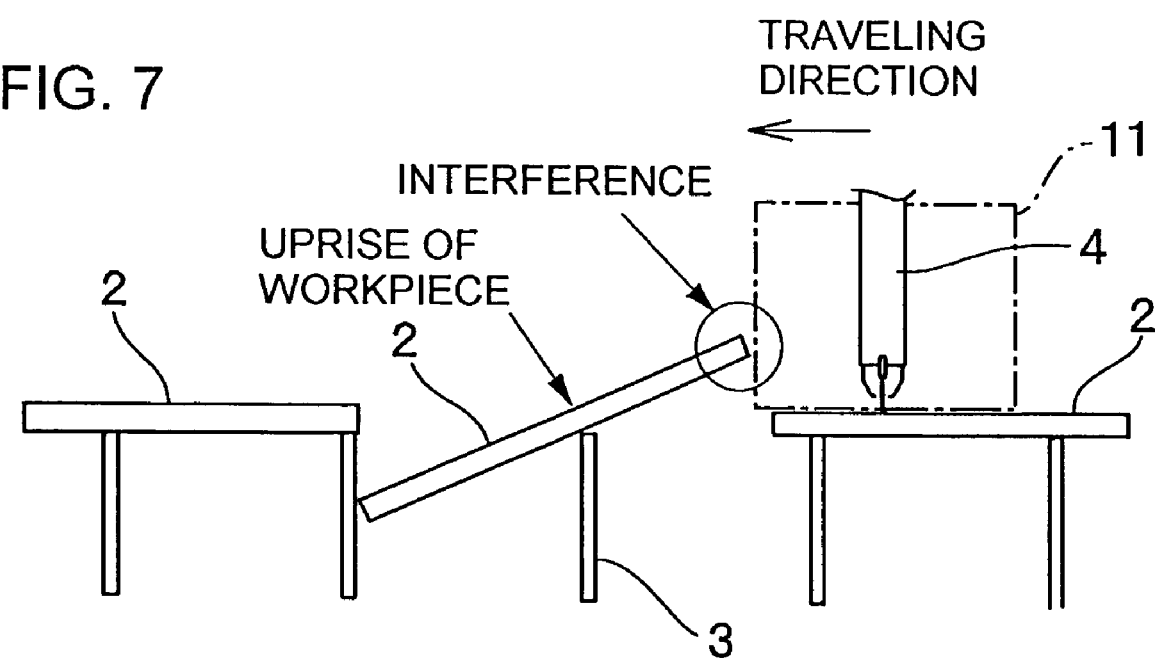
FIG. 7 shows an explanatory diagram illustrating an uprise of a workpiece and interference between the workpiece and a torch section in the thermal cutting machine.

In the actual plasma cutting operation, there usually occurs such a phenomenon that as shown in FIG. 7, a small cut piece, which has been produced by cutting the workpiece on the table during the movement of the torch, topples as it cannot be kept in a horizontal state, losing a support from the work-supporting bars of the table. According to the invention, the hood 11 is lifted to such a level that a specified spacing is left between the lower end of the hood 11 and the upper face of the workpiece 2 to prevent interference between them in the event of an uprise of the workpiece 2, and cutting is carried out with the hood 11 being kept at the above level. Accordingly, an uprise of the workpiece 2 does not cause damage to the hood 11 and, in consequence, there is no fear of halt of the machine due to damage.

In addition, even if the workpiece 2 is shifted in a thick-wise direction owing to thermal deformation, the machine will not be suspended, because the hood 11 has been lifted to the above-described specified level, thereby preventing interference between the hood 11 and the workpiece 2 and, therefore, an increase in the load of the horizontal movement of the plasma torch 4.

As a result, not only can unattended operation such as nighttime automatic operation be carried out, but also downtime and machine recovery time are obviated, so that improvements in machine utilization rate and productivity can be attained. Furthermore, it is no longer necessary to select a shape which does not cause an uprise of the workpiece and to assume the case where the degree of thermal deformation of the workpiece is slight. This improves the degree of freedom, easiness, and workability of preparation of the cutting operation program.

Additionally, since cutting is performed with the hood being kept at a level that provides a specified spacing between the lower end of the hood and the upper face of the workpiece, the condition of the plasma arc and the condition of the workpiece being processed can be easily observed any time during the cutting operation.

In the present embodiment, since the hood does not interfere with the workpiece as discussed earlier during the movement of the plasma torch in the cutting phase, the hood does not need to be made from a flexible material with the intention of avoiding the possible interference like the prior art, but can be made from a steel plate or the like which exhibits enough strength to withstand a large amount of spatter generated during the piercing phase. Use of a steel plate or the like extends the service life of the hood so that the frequency of replacement of the hood due to thermal damage caused by spatter can be significantly reduced.

There have been well known a technique for preventing adhesion of dross to the cut portion of the workpiece by application of a dross adhesion inhibitor to the workpiece prior to a cutting operation. This dross adhesion inhibitor may be applied not only to the workpiece but also to the inner wall of the hood, whereby spatter adhesion to the hood can be avoided and therefore no spatter wiping removal is involved, leading to improved maintainability.

Figure 8:
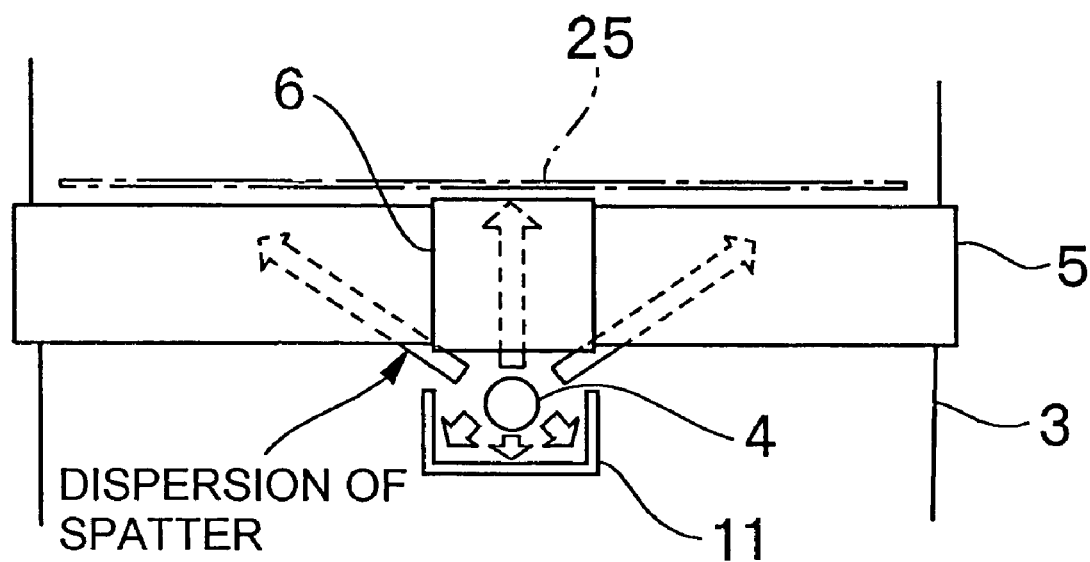
FIG. 8 shows an explanatory view illustrating the function of the hood during the cutting phase according to another embodiment.
Figure 9:
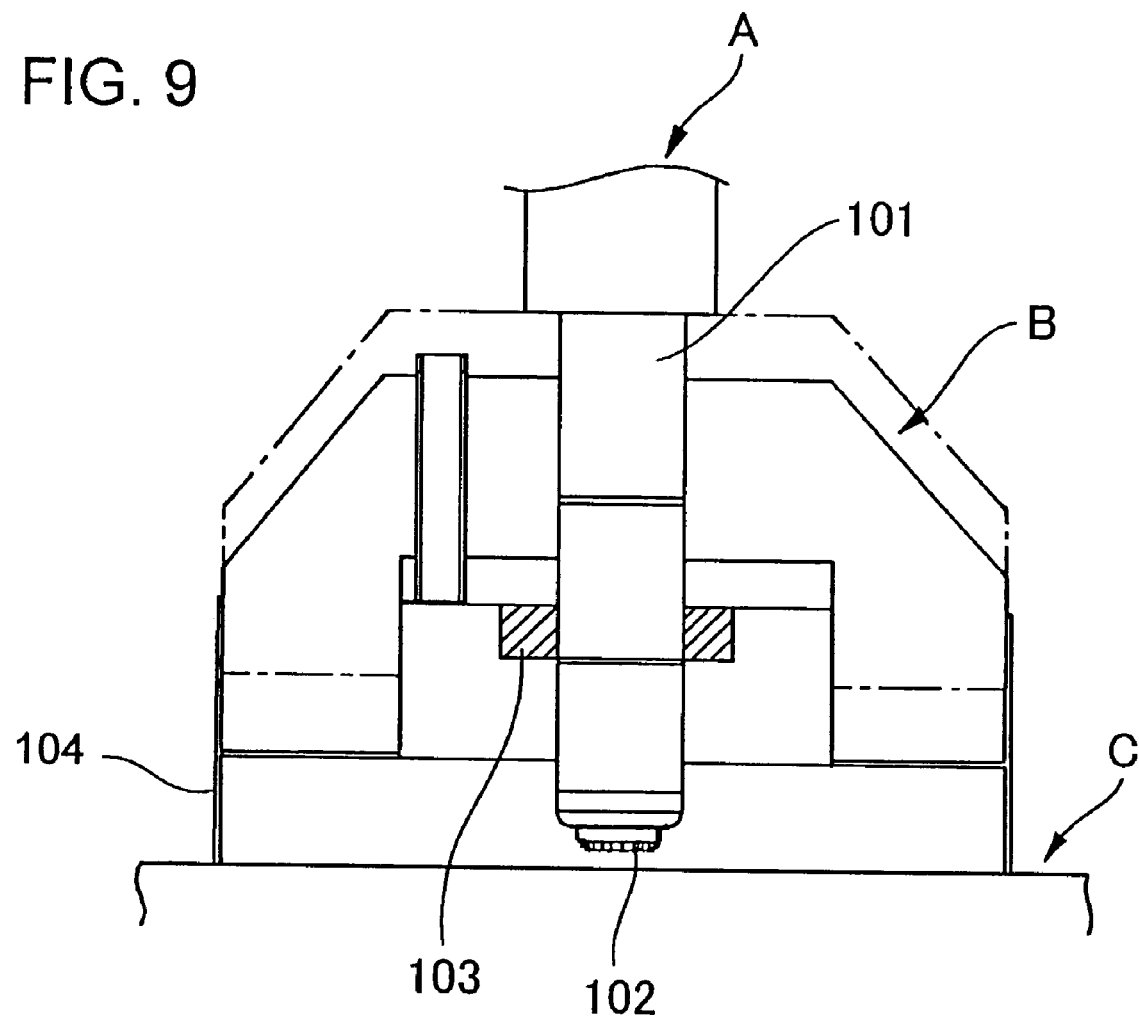
FIG. 9 is a side sectional view of a hood of a plasma cutting machine according to a prior art technique.

In the present embodiment, it is not essential to completely shield the plasma torch 4 from 360 degrees, and the plasma torch 4 may be exposed to one direction as shown in FIG. 8. In this arrangement, spatter may be allowed to positively disperse in this direction and the dispersed spatter may be prevented from flying in all directions by a curtain-like, heat-resistant fabric 25 instead of the liftable-type hood 11 mounted on the Z-axis truck 6, the heat-resistant fabric 25 being mounted on the Y-axis carriage 5 so as to extend over the travelling range of the Z-axis truck. 6 In this case, the heat-resistant fabric 25 is apart from the plasma torch 4 such that the temperature of the spatter drops during flying before the spatter hits the heat-resistant fabric 25. This reduces damage to the heat-resistant fabric 25. Another advantage is such that as the hood 11 is not filled with spatter, the durability of the hood 11 can be improved.

While the present embodiment has been discussed with a case in which the lifting/lowering of the hood 11 is carried out by the actuation of the air cylinder 15 under the guidance of the parallel links 13 in order to achieve a small-sized, lightweight cutting machine, the way of driving and guiding the hood 11 is not limited to this mechanism but other mechanisms may be employed. For instance, a motor and screw may be used as an actuator and a linear guide rail may be used for guiding the hood 11.

While the hood is made of a steel plate or the like in the present embodiment, a fixed curtain-like, heat-resistant fabric (which is not vertically movable with respect to the plasma torch) may be disposed to enclose the liftable-type hood. In this case, a large amount of highly-dispersive spatter generated during the piercing phase may be shut off by the high-strength, liftable-type hood, whereas minor spatter generated during the cutting phase may be shut off by the heat-resistant curtain surrounding the hood. The minor spatter generated during the cutting phase gives less damage to the heat-resistant curtain so that the curtain has a long service life and can be put into practical use. Additionally, use of two types of shielding means provides not only a more reliable and stable spatter shut-off function but also an effective light-shielding function.

A plasma cutting machine usually requires replacement of consumable parts such as a nozzle and electrodes attached to the leading end of the plasma torch several times a day, such replacement being carried out by removing the cap for the plasma torch. The hood located in the vicinity of the plasma torch, however, gets in the way of replacement, causing a decrease in operability. The present embodiment copes with this problem, by automatically timely lifting the hood to its upper end position through activation of the actuator based on programmed control or upon operation of a button. With this arrangement, the periodical lifting/lowering of the hood is carried out through programmed control taking account of the durability of consumable parts, thereby facilitating the replacement work of the consumable parts of the plasma torch to attain improved maintainability. In emergency situations, the timely lifting/lowering of the hood is carried out through depression of the button, thereby facilitating the replacement work of the consumable parts of the plasma torch to attain improved productivity.

While a plasma cutting machine is employed as a thermal cutting machine in the present embodiment, a laser cutting machine can be used in place of the plasma cutting machine.

As described above, the following effects can be achieved by the present embodiment.

A hood is disposed so as to surround the torch and is made to be vertically movable by the actuator, whereby the hood can be timely lowered by the actuator and piercing can be performed with the lower end of the hood in close contact with the workpiece in the piercing phase during which most of the total amount of spatter produced in the cutting operation is generated, dispersing (particularly in a horizontal direction) in a wide area around the nozzle, so that almost all of the spatter generated in the thermal cutting operation can be shut off. As a result, the dispersion of spatter to the surroundings in a wide area outside the thermal cutting machine, which could be a cause of fire, can be drastically lessened, so that the working environment of the plasma cutting machine or laser cutting machine can be significantly improved.

Since the hood can be horizontally moved, in the cutting phase, together with the torch in the condition in which the lower end of the hood is separated from the upper face of the workpiece to a minimum necessary extent with a specified gap therebetween, the hood will not interfere with the workpiece even if the uprise of the workpiece or warping of the workpiece due to thermal deformation occurs, so that there is no fear of interruption of the movement of the torch. Consequently, unattended operation/automation such as nighttime automatic operation becomes possible, leading to improved productivity.

In addition, since the interference between the hood and the workpiece can be avoided during the movement of the torch, the hood does not need to be made from a flexible thin sheet but may be made from a heat-resistant, rigid steel sheet, so that the hood will not be easily melted by spatter and, in consequence, the service life of the hood can be markedly increased. Further, by lifting the hood from the spatter shut-off position where the torch is shielded by the hood to a required level through operation of the button or through programmed control so that the nozzle position can be seen, the condition of the plasma arc or laser beam and the condition of the workpiece being processed can be easily observed. In addition, at the time of replacement of the consumable parts of the torch, the hood is automatically lifted from the torch-shielding position to a required level and kept at that level, whereby replacement of the consumable parts such as the nozzle and electrodes can be safely, easily carried out by both hands and thus, replacement workability can be improved.

What is claimed is:

1. A thermal cutting machine for cutting a metal by a plasma arc or laser beam, the machine comprising:
    a torch generating plasma arc or laser beam; and
    a hood which is disposed so as to surround the torch and is vertically movable relative to the torch by an actuator, wherein the hood comprises a hood body, and a lower hood member detachably attached to a lower portion of the hood body,
    wherein the lower hood member has a structure that either:
    (1) surrounds the torch completely in the horizontal direction, or
    (2) surrounds a portion the torch in the horizontal direction while a heat-resistant fabric surrounds the remaining portion of the torch in the horizontal direction.

2. A thermal cutting machine for cutting a metal by a plasma arc or laser beam, the machine comprising:
- a torch generating plasma arc or laser beam;
- a hood which is disposed so as to surround the torch and is vertically movable by an actuator, wherein the hood comprises a hood body, and a lower hood member detachably attached to a lower portion of the hood body; and
- a control unit for giving an instruction to the actuator to lower the hood to a torch-shielding position for covering the torch, at least during a piercing phase,
- wherein the lower hood member has a structure that either:
  - (1) surrounds the torch completely in the horizontal direction, or
  - (2) surrounds a portion the torch in the horizontal direction while a heat-resistant fabric surrounds the remaining portion of the torch in the horizontal direction.

3. A thermal cutting machine for cutting a metal by a plasma arc or laser beam, the machine comprising:
- a torch generating plasma arc or laser beam;
- a hood which is disposed so as to surround the torch and is vertically movable by an actuator; and
- a control unit for giving an instruction to the actuator to lower the hood to a torch-shielding position for covering the torch, at least during a piercing phase, wherein the control unit gives an instruction to the actuator to lift the hood to a specified level in a cutting phase subsequent to the piercing phase.

4. A cutting method by use of a thermal cutting machine comprising the steps of:
- cutting a metal by a plasma arc or laser beam generated from a torch, and
- lowering a liftable hood to cover the torch at least during a piercing phase of said cutting step, thereby shutting off spatter flying from a cut area of the metal,
- wherein the hood comprises a hood body, and a lower hood member detachably attached to a lower portion of the hood body, and
- wherein the lower hood member has a structure that either:
  - (1) surrounds the torch completely in the horizontal direction, or
  - (2) surrounds a portion the torch in the horizontal direction while a heat-resistant fabric surrounds the remaining portion of the torch in the horizontal direction.

5. A cutting method by use of a thermal cutting machine comprising the steps of:
- cutting a metal by a plasma arc or laser beam generated from a torch, and
- lowering a liftable hood to cover the torch at least during a piercing phase of said cutting step, thereby shutting off spatter flying from a cut area of the metal,
- wherein the hood is lifted to a specified level during a cutting phase subsequent to the piercing phase and during replacement of consumable parts of the torch.

* * * * *